United States Patent [19]

Jennings

[11] 4,201,022
[45] May 6, 1980

[54] WHEELED PORTABLE WELL DRILLING AND WORKOVER APPARATUS

[75] Inventor: Gary L. Jennings, Houston, Tex.

[73] Assignee: Pyramid Manufacturing Company, Houston, Tex.

[21] Appl. No.: 940,761

[22] Filed: Sep. 8, 1978

[51] Int. Cl.² ............................................ E04H 12/34
[52] U.S. Cl. .......................................... 52/118; 52/116
[58] Field of Search ......................... 52/116, 118, 119

[56] References Cited

U.S. PATENT DOCUMENTS

| 2,852,111 | 9/1958 | Fuller et al. | 52/119 |
| 2,922,501 | 1/1960 | Wilson | 52/118 |
| 4,138,805 | 2/1979 | Patterson | 52/118 |

FOREIGN PATENT DOCUMENTS 754392  8/1956  United Kingdom .................... 52/116

Primary Examiner—Alfred C. Perham
Attorney, Agent, or Firm—Jack W. Hayden

[57] ABSTRACT

A first wheeled trailer means includes support means for supporting a mast and drawworks thereon and a second wheeled trailer means includes an upright structure for supporting the mast in upright positon to conduct well operations. The second trailer means also includes ramp and platform means to receive and position the first trailer means thereon in elevated position whereby the mast may be pivotally engaged with the upright structure of the second trailer means so that thereafter the mast may be raised to an upright position for conducting well operations. The first and second trailer means also include cooperating means to position and secure them together to form a base substructure support for the elevated mast and the drawworks while the well operations are performed.

1 Claim, 4 Drawing Figures

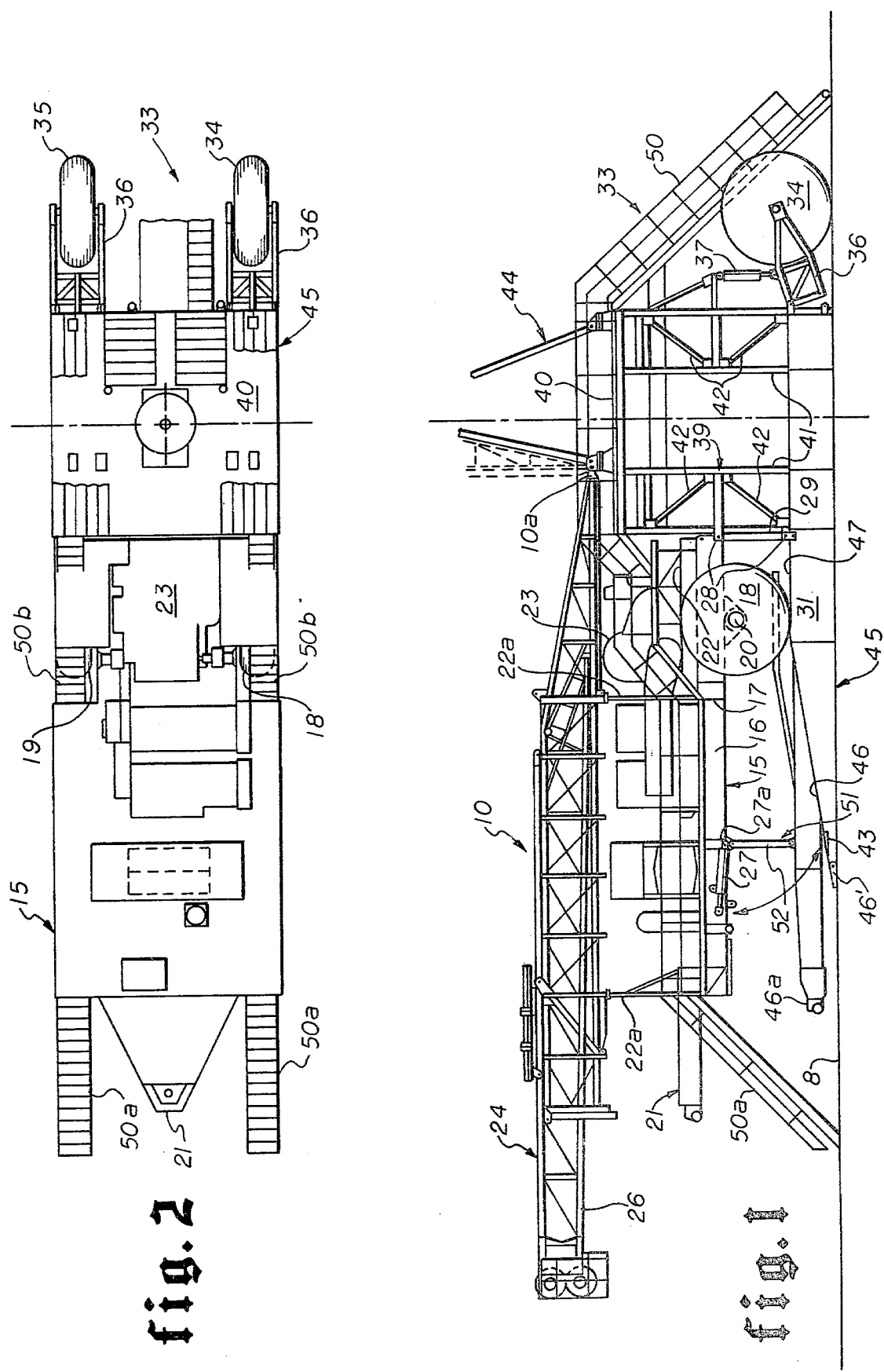

WHEELED PORTABLE WELL DRILLING AND WORKOVER APPARATUS

CROSS REFERENCE TO RELATED APPLICATION

This invention relates to trailer mounted mast and drawworks arrangements, and is an alternate form of the invention of Bradley C. Patterson filed Oct. 7, 1977, bearing Ser. No. 842,476 for "Wheeled Portable Trailer Substructure for Elevatable Drawworks, Masts and Setback Tower" U.S. Pat. No. 4,138,805.

SUMMARY OF THE INVENTION

Various types of trailer supported telescoping, elevatable masts and drawworks arrangements have been provided and employed in the prior art; however, such arrangements have generally necessitated the addition of, or complete building of, support substructure at the well site to enable the mast and drawworks to be properly positioned and supported to conduct well drilling operations. Such procedure is expensive and time consuming.

The present invention provides a pair of wheeled trailers, one of which includes an upright structure and the other trailer includes support means for the telescoping mast and drawworks thereon.

The second trailer means is constructed and arranged to provide ramp and platform means for receiving and supporting the first trailer means in elevated position relative to the earth's surface and to position the mast so that it may be engaged with the upright structure and pivotally raised. The trailer means are constructed and arranged so that when the first trailer means is positioned on the second trailer means they may be secured together to jointly form the base substructure and support for the mast and drawworks without the necessity of adding additional structural support at the well location.

When the first trailer means is positioned on the platform means of the second trailer means not only is the mast properly positioned relative to the upright structure so that it may be elevated to an upright position, but the drawworks and driller's platform on the first trailer means is properly positioned for conducting well operations.

After well operations have been completed, the mast is lowered to its support means on the first trailer means and the trailers then separated. The trailers then may be moved by any suitable means such as trucks or the like to a new well location and there repositioned without requiring that a new base substructure support for the mast and drawworks be constructed at the next well site.

The upright structure on the second trailer means includes an A-frame extending upwardly therefrom and with which the mast may be pivotally connected. The A-frame serves as a footing and support for the mast when it is raised to an upright position on the second trailer means while drilling operations are conducted.

Other advantages of the present invention will become apparent from a consideration of the following drawings and description.

BRIEF DESCRIPTION OF THE DRAWINGS

FIG. 1 is a side elevational view illustrating the first and second wheeled trailer means of the present invention positioned adjacent a well location to form a base support structure with the mast secured to the A-frame on the upright structure on the second trailer means prior to its elevation to an upright position;

FIG. 2 is a top plan view of the trailer arrangement of FIG. 1 with the telescoping mast omitted to more clearly illustrate the arrangement of the trailer means when secured together to form the base support structure and working area thereon;

DESCRIPTION OF THE PREFERRED EMBODIMENT

Figure 3:
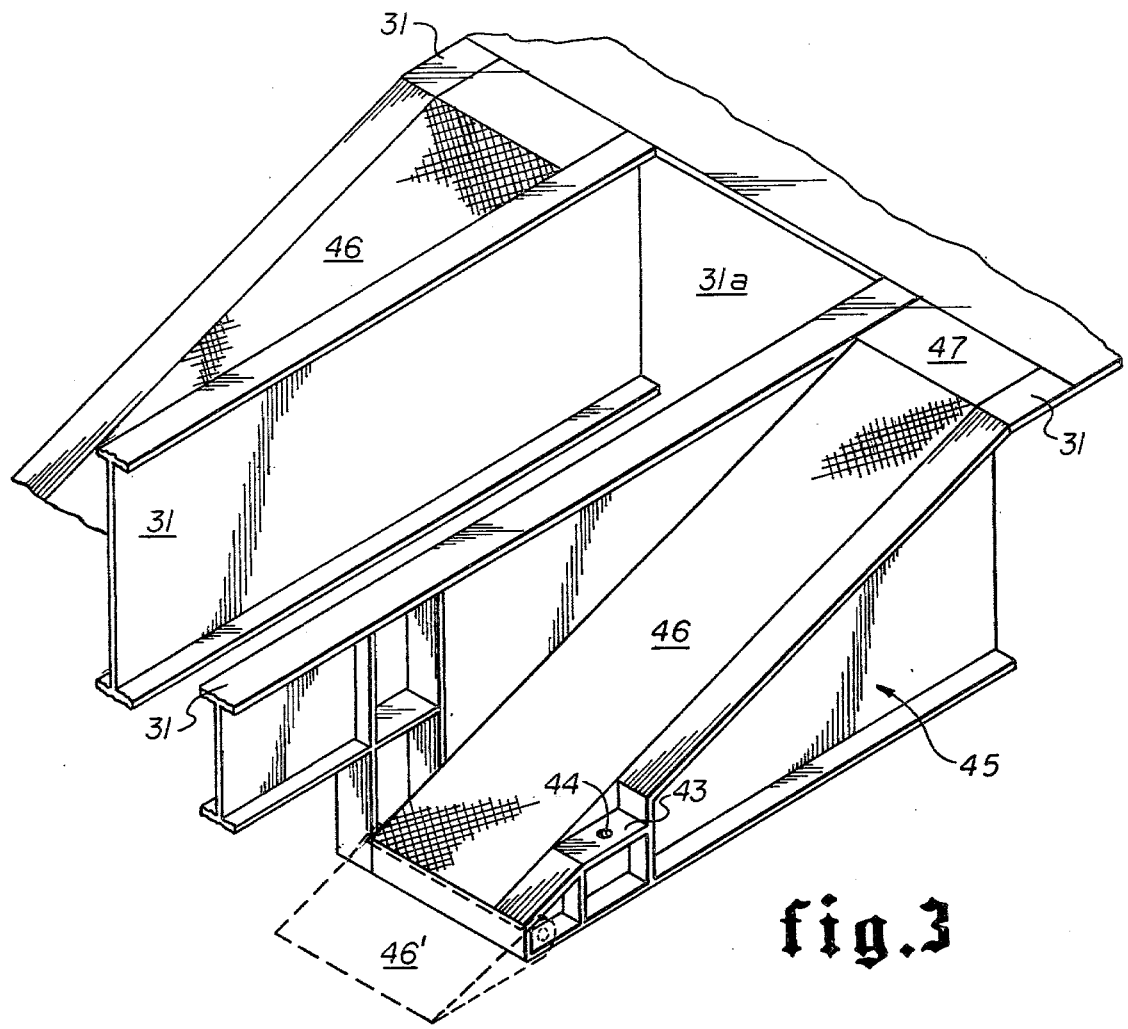
FIG. 3 is a partial side view illustrating structural details of the ramp means formed on the second trailer means.
Figure 4:
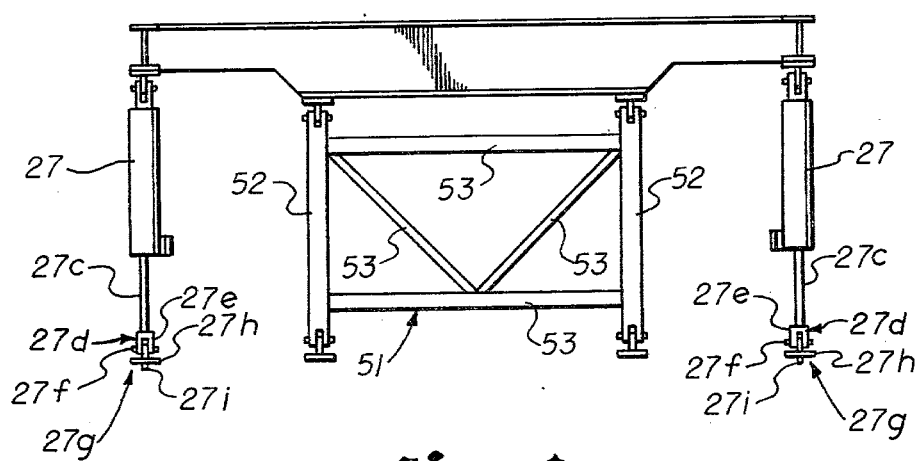
FIG. 4 is an end view to more clearly illustrate the retractable support frame for assisting in maintaining the first trailer means in elevated position on the second trailer means.

Attention is first directed to FIG. 1 of the drawings wherein the portable well drilling and workover apparatus for a well location of the present invention is illustrated generally by the numeral 10. The arrangement includes first wheeled trailer means referred to generally at 15 and second wheeled trailer means referred to generally at 45. The first trailer means 15 includes at least a plurality of longitudinally extending members or means 16 that are spaced laterally and which are connected together by suitable beams or braces represented by the numeral 17 extending laterally therebetween. A rotatable axle 20 is supported on the first trailer means 15 on which wheels 18 and 19 are mounted for enabling the first trailer means 15 to be moved over terrain from one well location to another. The first trailer means 15 also includes a suitable gooseneck arrangement 21 for enabling the first trailer means 15 to be connected with a vehicle (not shown) for movement over the terrain.

A drawworks 23 is supported on the first trailer means 15 in any suitable manner and upwardly extending members 22a are longitudinally spaced along the first trailer means 15 as shown in FIG. 1 to support the mast 24 on the first trailer means 15 in retracted position when the trailer is in transit from one well location to the next. The mast 24 includes the telescoped portions 25 and 26, which telescoped portions are adapted to be extended by any suitable means well known in the art. A drillers platform 22 is carried on the first trailer means 15 adjacent the drawworks 23. Hydraulic jack means 27 is pivotally mounted at one end as illustrated at 27a on each side of the first trailer means 15 and may be swung up and secured in an inoperative position on the first trailer means as shown in FIG. 1 when not in use. Each rod 27c of the hydraulic jacks 27, include an arrangement 27d for engaging the jacks in position on the second trailer means 45 during use. The arrangement 27d includes a clevis 27e on the end of each rod 27c through which pin means 27f extends. A footing 27g is pivotally supported on each pin 27f and includes a support place 27h and projection 27i depending therefrom for engaging the jack means 27 with the second trailer means as will be described hereinafter. When the first trailer means 15 is positioned on the platform 47 adjacent second trailer means 45 by a vehicle (not shown), as shown in FIG. 1, the hydraulic jack means 27 is swung down and engaged on the second trailer means 45 to enable the vehicle to be disengaged from the first trailer means 15.

The second trailer means 45 also includes longitudinally extending members 31 which are laterally spaced with lateral braces or beams such as 31a secured therebetween. A gooseneck 46a extends from one end of the second trailer means 45 to enable it also to be connected to a vehicle (not shown) for moving the second trailer means 45 from one well location to another. The wheel arrangement referred to generally at 33 on the second trailer means 45 includes the laterally spaced wheels 34 and 35 which are each independently supported on the end of the second trailer 45 as shown in FIG. 1. Each wheel 34 and 35 is carried by a bracket arrangement 36 with each bracket arrangement having a hydraulic cylinder 37 forming a part thereof so that when the lower portion of the bracket is disconnected from the second trailer means as illustrated in FIG. 1, the wheels pivot upwardly to enable the longitudinally extending members 31 of the second trailers means 45 to rest on the terrain illustrated at 8 in FIG. 1. When well operations are concluded, the hydraulic cylinder 37 can be actuated in a manner well known to pivot each bracket arrangement 36 and the wheel supported thereby downwardly whereupon the adjacent end of the second trailer means 45 is elevated. Brackets 36 are reconnected to the trailer means 45 for retaining each wheel 34, 35 in a position to accommodate transit of the trailer.

An upright structure 39 is formed on the second trailer means 45, such upright structure 39 extending upwardly above the longitudinal members 31 a desired distance to provide an elevated working surface or platform 40 for use during well operations. The upright structure includes an A-frame 44 supported on and extending upwardly from the platform 40. The A-frame provides a footing and support for the mast 24. The upright portion 39 is formed by a plurality of vertically extending members 41 secured together by braces 42 in any suitable manner, which along with the second trailer means 45 and first trailer means 15 secured thereto forms the base support substructure for the mast 24 and drawworks 23.

A sloping ramp 46 is formed on each side of the forward end of the second trailer means 45 and extends between the terrain 8 and an elevated platform 47 formed on the second trailer means 45 as shown in FIGS. 1 and 3.

The ramps 46 enable the wheels 18, 19 of the first trailer means 15 to be manuevered up on the first trailer means 15 as shown in FIG. 1. When the first trailer means is thus positioned, the trailer means 15 and 45 are then structurally secured together, and the first and second trailer means 15 and 45 are so relatively positioned that the foot 10a of the mast 24 may be pivotally secured or pinned to the lower end of the A-frame 44 as illustrated in FIG. 1 of the drawings. Such arrangement also positions the drawworks 23 and drillers platform 22 at a desired height relative to the working area 40 on the upright structure 39 whereby the driller is adjacent the drawworks 23 while still being in a position to observe operations being conducted on the working floor area 40 as well operations proceed. The drillers platform 22 may be any desired level beneath the level of the upper end of upright structure 39 on which is formed working floor 40, as illustrated in the drawings.

In operation at a well site, the second trailer means 45 is first positioned and aligned on the well site. The brackets 36 are disconnected at their lower end from trailer means 45 whereupon wheels 34 and 35 elevate so that the second trailer means 45 rests on the ground 8.

The first trailer means 15 is then moved upwardly along the ramps 46 onto the platform 47 until the wheels 18 and 19 rest on platform 47 of the second trailer means 45 as shown and the first trailer means 15 abuts or is in close proximity to the upright structure 39 on the second trailer means 45. As the trailer means 15 is positioned adjacent trailer means 45 by a vehicle, it can be appreciated that the end of the trailer means 15 nearest the second trailer means 45 extends upwardly at an angle. While the first trailer means 15 is so positioned, its end adjacent trailer means 45 is structurally connected with trailer means 45 by any suitable means such as pins 28 extending through connecting braces 29 for securing and positioning the first trailer means 15 and second trailer means 45 together to form the base substructure support and to retain it in such position as well operations are conducted. Thereupon the hydraulic jacks 27 are swung downwardly to engage the second trailer means 45 to elevate and maintain proper elevation of the forward end of the first trailer means 15. The manner of positioning and connecting trailer means 15 and 45 and then elevating the trailer 15 by the jacks 27 removes all load from the wheels 18 and 19 although they are tangent to platform 47. If desired a ramp or walk way 50 may be secured in position to extend between the terrain 8 and the working area 40 as shown in FIG. 1, and walkways 50a and 50b are provided for access to the drillers working area 22 and working area 40, respectively as shown more clearly in FIG. 2.

As better seen in FIG. 3, each ramp 46 includes a flat surface 43 along the edge thereof for receiving and supporting the jack means 27. A recess 44 is provided in the flat surface 43 for receiving the projection 27i on the arrangement 27d. When the jack means 27 are each swung down and engaged with the second trailer means 45 by positioning projection 27i in recess or opening 44, the support plate 27h rests on surface 43, and the hydraulic jacks thus elevate and retain the front end of trailer means 15 elevated, so that the vehicle may be disengaged from the gooseneck 21.

Each ramp 46 includes a portion 46' at the lower end thereof which is pivotally connected to each ramp 46. When the second trailer means is to be connected to a vehicle, the ramp portions 46' are folded upon their respective ramp 46 whereby access by the vehicle to gooseneck 46a is assured.

A support frame 51 is pivotally carried on first trailer means 15 in any suitable manner so that it can be lowered to engage on the longitudinal beams or members 31 between the ramps 46 and may be secured thereto by any suitable means such as bolts or the like. The support frame 51 includes suitable members 52 which extend vertically when the support frame 51 is in position as well as lateral bracing 53. After support frame 51 is in position, jack means 27 is disengaged and swung up out of the way.

When it is desired to extend and elevate the mast 24 to an upright position, this is accomplished by means well known in the art so that it may then be secured in position against the A-frame 44.

From the foregoing it can be seen that the first and second trailer means are arranged in a longitudinal, parallel relationship as shown in FIGS. 1 and 2 to position them to form the base support substructure for the mast 24 and the drawworks 23 during well operations at a well site. Also, the first and second trailer means provide cooperating means to enable them not only to be secured together but to position them so that the mast 24 may be fixed to the A-frame 44 on the upright portion 39 and then elevated to an upright position for conducting well operations.

The arrangement of the present invention is portable, and it eliminates the necessity of step-wise building a support substructure at each well location.

The foregoing disclosure and description of the invention are illustrative and explanatory thereof, and various changes in the size, shape, and materials as well as in the details of the illustrated construction may be made without departing from the spirit of the invention.

What is claimed is:

1. In a portable well drilling and workover apparatus for a well location having a telescoping mast, drawworks and a base substructure support, the invention comprising:
   a. first trailer means including wheels for moving said trailer means over the terrain;
   b. second trailer means including wheels for moving said trailer means over the terrain, said wheels on said second trailer means being constructed and arranged whereby they may be elevated when said second trailer means is on the well location;
   c. said first trailer means including support means to support the telescoping mast and drawworks thereon;
   d. said second trailer means including an upright structure and A-frame for transferring the telescoping mast from said first trailer means to said second trailer means to support the mast in upright position on said second trailer means to conduct well operations;
   e. cooperating means on said first and second trailer means to position them together to form the base substructure support;
   f. additional means on said first trailer means to support the telescoping mast on said first trailer means in position for pivotal engagement with said A-frame on said upright structure of said second trailer means whereby it may be transferred to said second trailer means for raising to an upright position for conducting well operations said additional means including:
      1. elevated platform means on said second trailer means; and
      2. ramp means connected to said elevated platform means on said second trailer means whereby said first trailer means may be positioned on said elevated platform to position the telescoping mast for pivotal engagement with said upright portion; and
   g. said first trailer means including a platform to provide a working floor adjacent the drawworks which is lower in vertical elevation than the upper end of said upright structure.

* * * * *